No. 778,982. PATENTED JAN. 3, 1905.
H. C. LUECKE.
GANG PLOW.
APPLICATION FILED JULY 7, 1904.
2 SHEETS—SHEET 2.
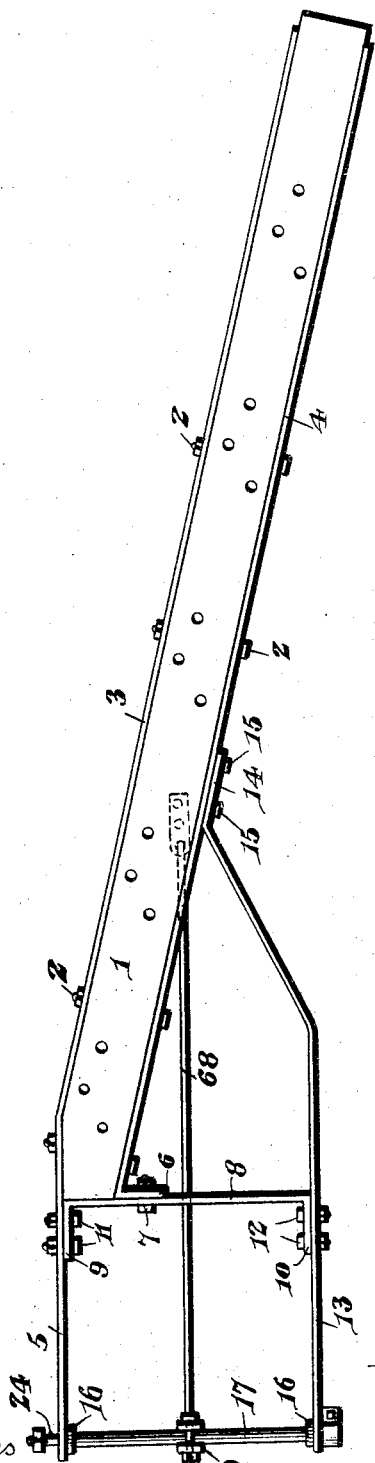
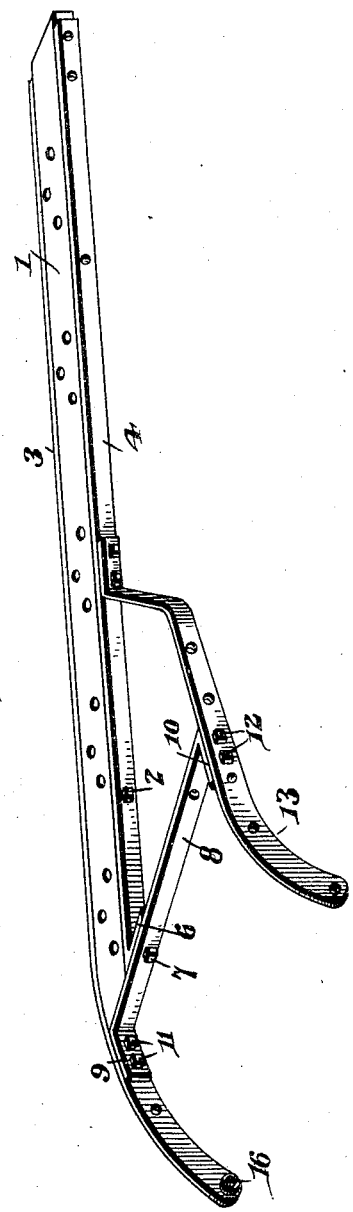
Witnesses
Jas. K. McCathran
Louis G. Julihn
Henry C. Luecke, Inventor
By E. G. Siggers
Attorney No. 778,982.

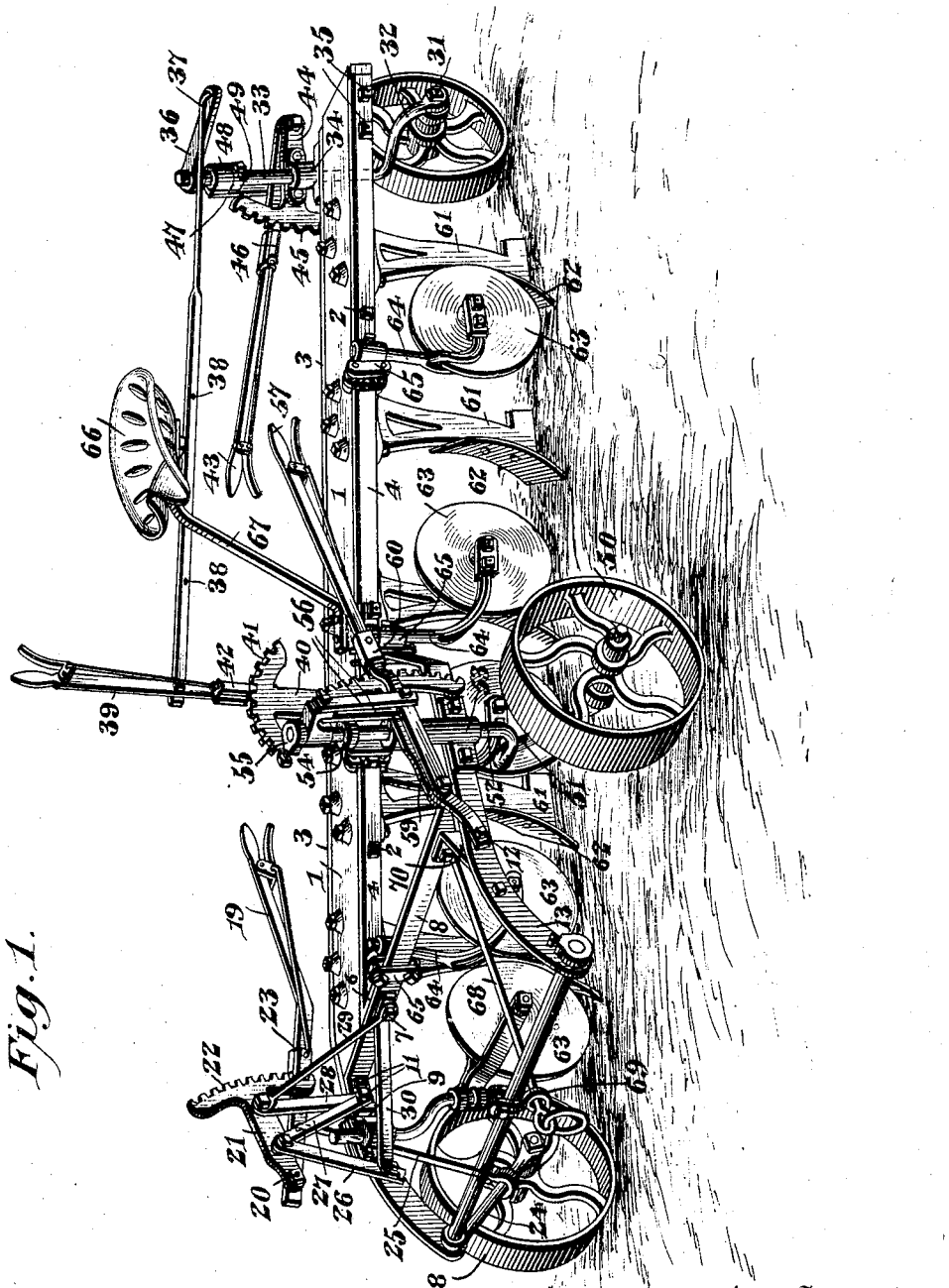

Patented January 3, 1905.

UNITED STATES PATENT OFFICE.

HENRY C. LUECKE, OF WICHITA FALLS, TEXAS.

GANG-PLOW.

SPECIFICATION forming part of Letters Patent No. 778,982, dated January 3, 1905.

Application filed July 7, 1904. Serial No. 215,634.

*To all whom it may concern:*

Be it known that I, HENRY C. LUECKE, a citizen of the United States, residing at Wichita Falls, in the county of Wichita and State of Texas, have invented a new and useful Gang-Plow, of which the following is a specification.

This invention relates to a novel gang-plow, the object being to produce a plow having a neat, compact, and durable frame structure composed of inexpensive separable elements capable of being organized in a rigid structure without necessity for the employment of skilled labor and adapted to be disorganized and reorganized with facility in the event of breakage or derangement of the parts.

Another object is to provide for the use of a greater or lesser number of plow units in the gang or series and to provide as a rear support for the plow a rear furrow-wheel associated with adjusting means for raising or lowering the rear end of the plow to regulate the depth of cut and with additional adjusting means arranged to shift the crank-axle of said wheel to properly resist the side draft of the plow and to aid in directing the latter in four-side plowing in order that comparatively sharp corners may be turned.

Another object is to associate with the plow elements or units a series of rotary colter-disks which serve to cut through vines, brush, or other similar obstructions in advance of the plow.

Subordinate to the recited objects are others which will more fully appear as the illustrated embodiment of the invention is described.

Referring to the accompanying drawings, Figure 1 is a perspective view of my plow complete. Fig. 2 is a plan view of the plow-frame, and Fig. 3 is a detail perspective view of the same subject-matter.

The frame of the plow includes a beam 1, disposed at an angle across the line of draft, as shown in Fig. 2, and preferably, though not necessarily, of wood. Along the opposite sides of the beam 1 are secured, as by bolts 2, a pair of metal frame-bars 3 and 4, which serve to stiffen the beam 1 and to protect the side faces thereof. The front end portion 5 of the bar 3 is disposed parallel with the line of draft and in obtuse angular relation to the main rear portion of said bar, this angular form being accommodated by imparting a corresponding contour to the adjacent side face of the beam 1. The front end of the frame-bar 3 is extended beyond the beam 1, and its extremity is downwardly deflected, as shown in Fig. 3, for a purpose to be described.

The frame-bar 4, extending along the opposite side of the beam, is not extended beyond the front end of the latter, but, on the contrary, is provided with a deflected front extremity 6, disposed transverse to the line of draft and secured, as by a bolt 7, to a transverse frame-bar 8, imposed against the front end of the beam 1 and provided with angular ends 9 and 10, the former being secured, as by bolts 11, to the front end portion 5 of the frame-bar 3. The angular end 10 of the transverse frame-bar 8 is secured, as by bolts 12, to a frame-bar 13, the front end portion of which is parallel with the front end portion 5 of the bar 3 and has its front extremities similarly deflected downwardly, as shown in Fig. 3. At a point somewhat in rear of the bar 8 the bar 13 is deflected toward the beam 1 and is formed with an angular rear extremity 14, secured, as by bolts 15, which preferably pass through the bars 3 and 4, the beam 1, and the end 14 of the bar 13 to effect the rigid retention of these several elements. It will thus be seen that the frame is made up of rearwardly-converging side bars 3 and 13, having parallel front end portions located substantially in or parallel with the line of draft and having downwardly-deflected front ends, a transverse frame-bar 8 connecting the side bars, a beam disposed at an angle across the line of draft and connected to the rear end portions of the side bars, and an additional frame-bar 4, extending along one side of the beam and rigidly secured to the bars 8 and 13, respectively. While this assemblage of elements constitutes an extremely simple frame structure of great rigidity, it will be seen to embody no elements which could not be readily duplicated by an ordinary blacksmith or which would require expert assistance for their removal from or replacement in the frame.

The downwardly-deflected front ends of the side bars 3 and 13 are provided with bearings 16 for the crank-axle 17 of the front furrow-wheel 18, with reference to which latter the front end of the plow-frame is adjusted vertically by a lever 19. The lever 19 is fulcrumed at 20 upon a bracket 21, provided with a segmental rack 22, arranged to be engaged by the latch 23 of the lever for the purpose of retaining the latter in its adjusted positions, said lever being connected at a point in rear of its fulcrum with the angular end 24 of the crank-axle 17 by means of a connecting-rod 25. Obviously by shifting the lever in one direction or the other the front end of the frame may be raised or lowered for the purpose of regulating the depth of cut of the plow elements or units, to be hereinafter described.

While the bracket 21 may be supported by the frame in a variety of ways, it is preferably carried by a plurality of standards 26, 27, and 28, this supporting structure being augmented by a pair of braces 29 and 30, retained at their proximate ends—as, for instance, by the bolt 7—the upper end of the brace 29 being bolted to the upper extremity of the standard 28, and the front end of the brace 30 being bolted to the lower end of the standard 26, as clearly shown in Fig. 1. The rear furrow-wheel 31 is mounted on a rear crank-axle 32, having a vertical portion or stem 33, journaled in a bearing-bracket 34, secured at one side of the beam adjacent to the rear end thereof by bolts 35. For the purpose of rotating the stem 33 of the crank-axle 32 in order to properly train the rear furrow-wheel said stem is provided with an arm 36, to the outer end of which is hooked one extremity of a connecting-rod 37, provided with a series of bolt-holes 38, through either one of which a bolt may be passed to secure the connecting-rod to a rear furrow-wheel-adjusting lever 39. The lever 39 is fulcrumed on a bracket 40, fixed to the beam 1 and provided with a toothed segment 41, designed to be engaged by a latch 42 of the lever. By manipulating this lever 39 in an obvious manner the crank-axle 32 may be rotated on its vertical axis for the purpose of disposing the rear furrow-wheel in line with or at an angle to the line of draft.

The rear end of the plow-frame is adjusted by means of a rear frame-adjusting-lever 43, fulcrumed upon a bracket 44, fixed to the bearing-bracket 34 and formed with a toothed segment 45, disposed for engagement with the latch 46 of the lever. The connection of the lever 43 with the stem 33 of the rear crank-axle is effected through the medium of a link 47, pivoted at its lower end to the lever and at its upper end to a swiveled collar 48, mounted on the stem 33, above a fixed collar 49. It will now be seen that while the rear crank-axle 32 may be swung as desired by the manipulation of the lever 39 the bearing-bracket 34 is free to move vertically upon the stem 33 when the rear end of the plow-frame is adjusted vertically through the manipulation of the lever 43. The land-wheel 50 is mounted on a crank-axle 51, whose vertical stem 52 is journaled in a bearing-bracket 53, bolted or otherwise secured to the frame-bar 13, preferably just in rear of the bar 8. The axle 51 is free to rotate on its vertical axis; but its stem 52, like the stem 33 of the rear crank-axle, is equipped with fixed and swiveled collars 54 and 55, which latter is connected by links 56 with a frame-adjusting lever 57, fulcrumed on a bracket 58, provided with a toothed segment 59, to be engaged by the latch 60 of the lever 57.

We have now seen the manner in which the frame is constructed, supported, and vertically adjusted, and the instrumentalities whereby the rear furrow-wheel may be properly trained with respect to the line of draft, so that it may serve to aid in resisting the side draft of the plow under various conditions or be utilized in turning the plow or allowed to swing free at the will of the operator, attention being called to the fact that the connecting-rod 37 may be unhooked from the arm 36 to allow the rear axle to swing freely, if desired.

I will now proceed to the description of the plow and colter units with which the frame is equipped. At intervals along the beam 1 are bolted a series of pendent plow-standards 61, equipped with plow elements 62, preferably, though not necessarily, of reversible form. In advance of each plow element 62 is located a rotary colter-disk 63, designed to sever vines or other similar obstructions in advance of the plows to prevent clogging of the latter. The colter-disks 63 are mounted in colter-standards 64, carried by colter-brackets 65, detachably secured to the frame of the plow, these brackets 65 being variously secured, as shown in Fig. 1, to the frame-bars 3, 4, and 13.

The driver's seat 66 is mounted, as usual, upon a seat-spring 67, secured to the beam at a proper point to locate the driver in convenient proximity to the several levers for adjusting the plow-frame and the rear crank-axle.

The manner in which the draft appliance is connected to the plow may be varied; but by preference a draw-bar 68 is secured at its rear end to the beam 1 (shown in Fig. 2) and is guided at its front end by a guide 69, mounted on the front crank-axle 17 midway between the bars 5 and 13 of the frame. Preferably a diagonal brace 70, similar in construction and arrangement to the brace 30, is employed to connect the bars 8 and 13, as shown in Fig. 1.

In the illustrated form of plow the maximum number of plow units for which provision is made is five; but it is contemplated to employ a smaller number of units, if desired. For instance, if it is only desired to utilize four units in the gang the rear plow-standard and colter-bracket are removed from the beam and by loosening the bolts 35 the bearing-bracket 34 is detached from the beam and is reapplied to the latter at an advanced point, the series of holes 38 in the connecting-rod 37 enabling the connection of the latter with the lever 39 to be adjusted to accommodate this rearrangement of parts.

It is thought that from the foregoing the construction, operation, and many advantages of my plow will be fully comprehended; but while the present embodiment of the invention is believed at this time to be preferable I reserve the right to effect such changes, modifications, and variations of the illustrated structure as may come fairly within the scope of the protection prayed.

What I claim is—

1. In a plow, the combination with a frame provided with a bearing-bracket, a rear furrow-wheel, and a rear crank-axle therefor provided with a vertical stem extending through the bearing-bracket, of a driver's seat supported above the frame, a lever fulcrumed on the bracket and having its handle end disposed below and adjacent to the driver's seat, a collar swiveled on the stem of the crank-axle, a link connecting the lever and the swiveled collar whereby the raising and lowering of the lever will effect corresponding adjustments of the frame, an arm extending from the stem of the crank-axle at a point above the swiveled collar, a link extending from said arm, and a second lever disposed vertically adjacent to the driver's seat and having connection with the last-named link to permit the rotation of the stem and the consequent adjustment of the rear furrow-wheel with respect to the line of draft.

2. In a plow, the combination with a frame including a pair of side members, of a front crank-axle having a horizontal portion extending between and rotatable in the front ends of the side members and having an angular portion extending radially from the horizontal portion of the axle, a frame-adjusting lever mounted on the frame, and a link connecting said lever to the angular portion of the front crank-axle.

3. In a plow, the combination with a frame, including a pair of side members, of a front crank-axle extending between and journaled in the front ends of said members, a frame-adjusting lever mounted above the frame, a link connecting said lever with the crank-axle, and means for retaining the lever in its adjusted positions.

4. A plow-frame, including a pair of members having their front portions parallel and their rear portions disposed in convergent relation, of a plow-beam retained between the converging portions of said members and disposed at an angle across the line of draft.

5. A plow-frame, including a wooden beam disposed at an angle across the line of draft, a pair of metal frame-bars extending along the opposite sides of the beam, one of said frame-bars being extended in advance of the beam, a third frame-bar also extended in advance of the beam and secured at its rear end to the latter, and a transverse frame-bar located at the front end of the beam and rigidly secured to the several other frame-bars.

6. A plow-frame, including a wooden beam disposed at an angle across the line of draft, a pair of frame-bars having parallel front ends disposed at an angle to the beam and also having convergent rear portions, a transverse frame-bar connecting the first-named frame-bars in advance of the beam, and a fourth frame-bar secured at its front end to the transverse frame-bar and extended along one side of the beam.

7. A plow-frame, including a wooden beam disposed at an angle across the line of draft, and a series of metal frame-bars associated with the beam and protecting the opposite sides thereof, certain of said frame-bars being extended in advance of the beam and in parallel relation.

8. A plow-frame, including a metal frame-bar having its front portion disposed parallel to the line of draft and its rear portion deflected at an angle across the line of draft, a plow-beam bolted to the deflected rear portion of said frame member, a second metal frame member extending along the opposite side of the beam and terminating at its front end, the third frame member having its front end portion parallel with the front end portion of the member first named and having its rear end deflected and bolted to the beam at a point intermediate of its ends, and a transverse frame member imposed against the front end of the beam and rigidly connecting the several other frame members.

In testimony that I claim the foregoing as my own I have hereto affixed my signature in the presence of two witnesses.

HENRY C. LUECKE.

Witnesses:
 THOS. A. HUFF,
 W. W. REID.